US000001162H

United States Statutory Invention Registration [19]

[11] Reg. Number: H1162

[43] Published: Apr. 6, 1993

Yamamoto et al.

[54] MOLDED COMPOSITE ARTICLE AND PROCESS FOR PRODUCING THE SAME

[76] Inventors: Michio Yamamoto, 3-1-40, Yamate-cho, Iwakuni-shi, Yamaguchi-ken, Japan, 740; Haruo Negishi, 481-11, Shiromeguri, Kamakura-shi, Kanagawa-ken, Japan, 247

[21] Appl. No.: 684,510

[22] Filed: Apr. 15, 1991

Related U.S. Application Data

[63] Continuation of Ser. No. 376,151, Jul. 7, 1989, abandoned, which is a continuation of Ser. No. 98,971, Sep. 10, 1987, abandoned.

[30] Foreign Application Priority Data

| | | | |
|---|---|---|---|
| Sep. 11, 1986 | [JP] | Japan | 61-212777 |
| Sep. 16, 1986 | [JP] | Japan | 61-216004 |
| Sep. 29, 1986 | [JP] | Japan | 61-228404 |
| Mar. 2, 1987 | [JP] | Japan | 62-45121 |

[51] Int. Cl.[5] ..... B32B 31/08

[52] U.S. Cl. ..... 156/179; 156/182; 156/224; 156/243

[58] Field of Search ..... 156/178, 179, 182, 224, 156/243, 245; 264/257, 258; 428/105, 110, 114, 294

[56] References Cited

U.S. PATENT DOCUMENTS

| | | | |
|---|---|---|---|
| 2,964,442 | 12/1960 | Hansen | 156/224 |
| 3,230,127 | 1/1966 | Cleereman et al. | 156/243 |
| 3,272,645 | 9/1966 | Duhoo et al. | 156/178 X |
| 3,565,741 | 2/1971 | Jaray | 428/114 |
| 3,660,197 | 2/1972 | Morgan et al. | 156/178 X |
| 3,664,909 | 5/1972 | Ackley | 156/181 X |
| 3,713,962 | 1/1973 | Ackley | 156/148 X |
| 3,737,352 | 6/1973 | Avis et al. | 156/181 |
| 3,784,433 | 1/1974 | Garnish et al. | 156/176 X |
| 3,791,911 | 2/1974 | Yaeger et al. | 156/179 X |
| 3,850,723 | 11/1974 | Ackley | 156/180 |
| 3,939,024 | 2/1976 | Hoggatt | 264/258 |
| 4,495,017 | 1/1985 | Abe et al. | 156/181 |
| 4,588,538 | 5/1986 | Chung et al. | 264/136 |
| 4,590,027 | 5/1986 | Murphy et al. | 264/258 |
| 4,770,838 | 9/1988 | Cattanach et al. | 264/510 |

FOREIGN PATENT DOCUMENTS

| | | | |
|---|---|---|---|
| 1049388 | 2/1979 | Canada | 156/178 |
| 0013338 | 9/1962 | Japan | 156/243 |
| 53-28683 | 3/1978 | Japan . | |
| 55-85825 | 6/1980 | Japan . | |
| 0142615 | 11/1980 | Japan | 156/178 |
| 0162317 | 9/1983 | Japan | 156/179 |

*Primary Examiner*—Robert L. Stoll
*Assistant Examiner*—Joseph D. Anthony

[57] ABSTRACT

Disclosed are a molded composite article having a curved surface which is composed of at least one laminate comprising continuous filaments unidirectionally paralleled and an extensible resinous film, and a process for producing the same. According to the present invention, the laminate comprising the continuous filaments and the film can be easily molded into the article with a curved surface without breakage or a reduction of strength, and the molded composite article is sufficient in strength, and excellent in smoothness of the surface and in appearance.

3 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOLDED COMPOSITE ARTICLE AND PROCESS FOR PRODUCING THE SAME

This is a continuation of application Ser. No. 07/376,151, filed on Jul. 7, 1989, which was abandoned upon the filing hereof, which is a continuation of Ser. No. 07/098,971, filed Sep. 10, 1987, now abandoned.

BACKGROUND OF THE INVENTION (1) Technical Field

This invention relates to a molded composite article and a process for producing the same, particularly to a molded composite article having a curved surface which is composed of at least one laminate comprising continuous filaments and a film and a process for producing the same.

(2) Background Information

With the recent development of sciences and industries, the situation is often brought about that the materials conventionally used in various fields are insufficient in their physical properties and can not perform the satisfactory functions. For example, with respect to the airplanes, the strength per weight and the modulus of the materials are required to be improved. In the field of space instruments, the development of the materials having the high specific strength and specific modulus is desired for a reduction of cost. Further, when the outside plates of the automotive vehicles are formed of plastic materials for decreasing their weight, the plastic materials having the high rigidity are required.

On the other hand, by the recent development of the textile techniques, the fibers having the strength per weight and the modulus higher than those of iron have been developed. For example, there are mentioned inorganic fibers such as carbon fibers, SiC fibers and boron fibers, and organic fibers such as p-aromatic polyamide fibers (for example, Kevlar ® supplied by Du Pont and Technora ® supplied by Teijin Limited) and high density polyethylene fibers (for example, Techmilon ® supplied by Mitsui Petrochemical Industries, Ltd.). It is thought that these high performance fibers are bound with a resin to provide a new material or incorporated in the conventional resin, metal or the like for reinforcement. These processes have partially been employed for practical use. For example, there are mentioned a FRP (Fiber Reinforced Plastic), a FRM (Fiber Reinforced Metal), a CC (Carbon-Carbon) composite and the like.

Theoretically, the continuous filaments are superior to the staple fibers in reinforcing effect of the composite material. Therefore, in case that the FRP product is produced by using the most advanced composite, the continuous filaments are combined with the thermosetting resin of B stage. When the FRP product is manufactured by using the thermoplastic resin, the staple fibers are generally employed as reinforcing fibers. In this case, however, the product are limited in physical properties. Further, the staple fibers come to appear at the surface of the product and the surface is roughened, whereby the appearance of the product is deteriorated. On the other hand, when the thermosetting resin of B stage is used, there are the problems that the resin is inferior in processability including storage stability because of a considerable change with the passage of time, and that the resin is required to be cured by heat treatment. Therefore, the composite materials prepared by the combination of the continuous filaments and the thermoplastic resins have recently been studied.

However, these composite materials have a problem that they are inferior in handling easiness because of their hardness. For solving this problem, it has been considered that the fabric composed of the same thermoplastic resin as the matrix resin to be melted is combined therewith td provide the composite material. It has also been studied that the fabric for reinforcement and the film of the matrix resin, each of which is separately prepared, are alternately laminated when molded and then the film is melted. The composite material obtained according to these processes is restricted by the shape of the molded article, because the fabric lacks in stretchability when laminated and molded. That is to say, it is difficult to form the composite material into a curved surface, particularly into a spherical surface. Further, the adhesion of the fibers with the matrix resin is not necessarily good. Furthermore, as the important fact, when the composite material reinforced with the continuous filament fabric is formed into a curved surface, the continuous filament fabric is broken on molding. Accordingly, the reinforcing effect is often reduced to the degree similar to that of the staple fiber fabric. In some cases, the composite material itself comes to be broken.

Further, even if the continuous filaments unidirectionally paralleled are used for reinforcement, when the sufficient tension is not applied to the filaments on molding, the tensile strength or the initial modulus of the molded article is liable to vary or not to be satisfactorily increased. Thus the satisfactory results can not be obtained.

On the other hand, Japanese Patent Application Laid-open No. 28683/1978 discloses a decorative laminated sheet wherein a transparent film having a back-printed moire pattern is laminated on a substrate sheet comprising fibers or filaments unidirectionally paralleled and fixed. Japanese Utility Model Application Laid-open No. 85825/1980 further discloses a heat-resistant composite material comprising a continuous filament sheet unidirectionally arranged and a heat-resistant film laminated therewith. However, the former is used as a decorative sheet for a building material, particularly as a film-form pattern paper, and the latter is used as an electrical insulating tape. These are different from the molded composite article having a curved surface claimed in the present invention.

U.S. Pat. Nos. 3,664,909, 3,713,962 and 3,850,723 further disclose a composite mat structure for use in reinforced stampable resinous articles comprising a mat of fibrous strands and a mat of unstranded filaments, the mats being impregnated with a resin, and the preparation thereof. This composite material is more easily formed into a curved surface, particularly into a spherical surface than the composite material reinforced with the fabric described above. However, the molded article prepared from this material is inferior in physical properties and the surface thereof is liable to be roughened.

SUMMARY OF THE INVENTION

The present invention has been completed for solving the conventional problems described above.

It is a primary object of the present invention to provide a molded composite article having a curved surface which can be formed without breakage or a reduction of strength, said article being excellent in smoothness of the surface and in appearance, and sufficient in strength; and a process for producing the same.

For the purpose of achieving the above-mentioned object, the present inventors have variously studied molded composite articles. As a result, it has been found that the problems described above can be solved by a laminate of continuous filaments unidirectionally paralleled and an extensible resinous film, thus arriving at the present invention.

In accordance with the present invention, there are provided (1) a molded composite article having a curved surface which is composed of at least one laminate comprising continuous filaments unidirectionally paralleled and an extensible resinous film; and (2) a process for producing a molded composite article having a curved surface which comprises unidirectionally paralleling continuous filaments, laminating the filaments on an extensible resinous film to provide a laminate, and thereafter molding the laminate so as to form the curved surface.

DESCRIPTION OF THE PREFERRED EMBODIMENTS

In the present invention, the continuous filaments are sufficiently used, if they are relatively heat-resistant. For example, as the continuous filaments, there can be mentioned carbon fibers, SiC fibers, glass fibers, aramid fibers, aromatic polyetheramide fibers, arylate fibers, polyester fibers, polyamide fibers and the like. Polypropylene fibers may be used according to a thermoplastic polymer for the film. Also, natural fibers such as hard and bast fibers may be used as circumstances require. The fibers having a high strength and a high initial modulus are preferable.

On the other hand, the extensible resinous film employed in the present invention can be composed of any resin, which is not particularly limited, if the resin can be used as the matrix resin of the composite material and formed into a film. The resin for the extensible resinous film includes, for example, thermoplastic resins such as polyamides (nylon and the like), polyolefins (polyethylene, polypropylene and the like), polyesters (polyethylene terephthalate, polybutylene terephthalate,arylates and the like), polycarbonates, polyvinyl compounds (polystyrene, polyvinyl chloride and the like) polyacrylonitrile, polyethers, polyetheretherketone, polysulfones and the like. In general, the resin is preferable to be heat-resistant and amorphous, or to be small in change with the passage of time even if the resin is crystalline. Particularly, the resin having a low melt viscosity is preferred. Therefore, an optically anisotropic polymer may also be used. As the resin for the extensible resinous film, there can also be used thermosetting resins such as epoxy resins, acrylic acid resins, unsaturated polyesters and the like.

Further, the film of the thermoplastic resin and the film of the thermosetting resin may be used in combination. For example, the film of the thermosetting resin may be laminated on the film of the thermoplastic resin and the continuous filaments may be laminated thereon, and also the continuous filaments may be laminated on the film of the thermoplastic resin and the film of the thermosetting resin may be laminated thereon. These resins are desirable to be excellent in extensibility when formed into a film and to be satisfactory in adhesive property and compatibility with a matrix resin when molded after the addition of the matrix resin. It is therefore effective to modify the resins by the polymer blend technique, the molecular composite process and so on, incorporating an elastic polymer or the like therein. In order to improve the adhesive property of the resin with the fibers and the properties of the molded resin, a thermosetting resin for crosslinking the polymer can be added. If circumstances require, there may be used for the fibers the same kind of polymer as that of the film. For example, the fibers of polymethaphenylene isophthalamide and the film thereof can be combined.

Figure 1:
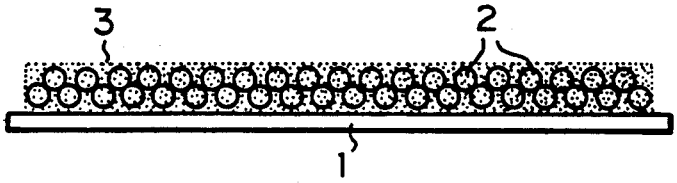
FIGS. 1. and 2 are longitudinal sectional views each showing an embodiment of the laminate used in the present invention.
Figure 2:
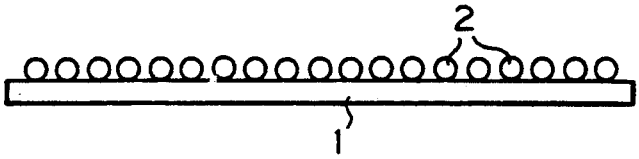

The molded composite article of the present invention is composed of at least one laminate comprising the above-mentioned continuous filaments unidirectionally paralleled and the above-mentioned extensible resinous film. FIGS. 1 and 2 are longitudinal sectional views showing some embodiments of the laminates used in the present invention. In FIG. 1, the layer of continuous filaments 2 unidirectionally paralleled is adhered to the extensible resinous film 1 by means of an adhesive 3. In FIG. 2, the layer of continuous filaments 2 unidirectionally paralleled is bonded to the extensible resinous film 1 by fusion. A layer of a resin can further be added to these laminates. For example, a film of a thermoplastic resin may be adhered on the continuous filament layer 2, or a solution or a melt of a thermoplastic resin may be applied on the continuous filament layer 2. When the resin layer is added in the form of film, it is preferable that the strength and the initial modulus of this resin are different from those of the extensible resinous film 1, because of tractability on processing. Heat-fusible binder fibers can also be incorporated in the continuous filament layer 2.

In order to laminate the continuous filament layer 2 on the extensible resinous film 1, for example, the extensible resinous film is continuously supplied from a film-forming apparatus, and then laminated with the continuous filaments which are fed while opened and paralleled. In this case, the continuous filaments are preferable to be restricted by another elastic fibers or the like to such an extent that they can spread in the direction perpendicular to the fiber axis, because of tractability.

The film previously formed of the thermoplastic resin may be supplied. In this case, it is preferable that the film is used before a long lapse of time after the film formation and preheated when used. The thermoplastic resin is generally crystallized after the film formation and the crystallization proceeds with the lapse of time. In case of the present invention, it is preferable that the crystallization of the film does not proceed. When the flexibility is required for the composite material, the thinner film is preferred. Therefore, it is necessary to take care so that the crystallization and orientation do not proceed too much, although the film may be drawn after the formation.

Figure 3:
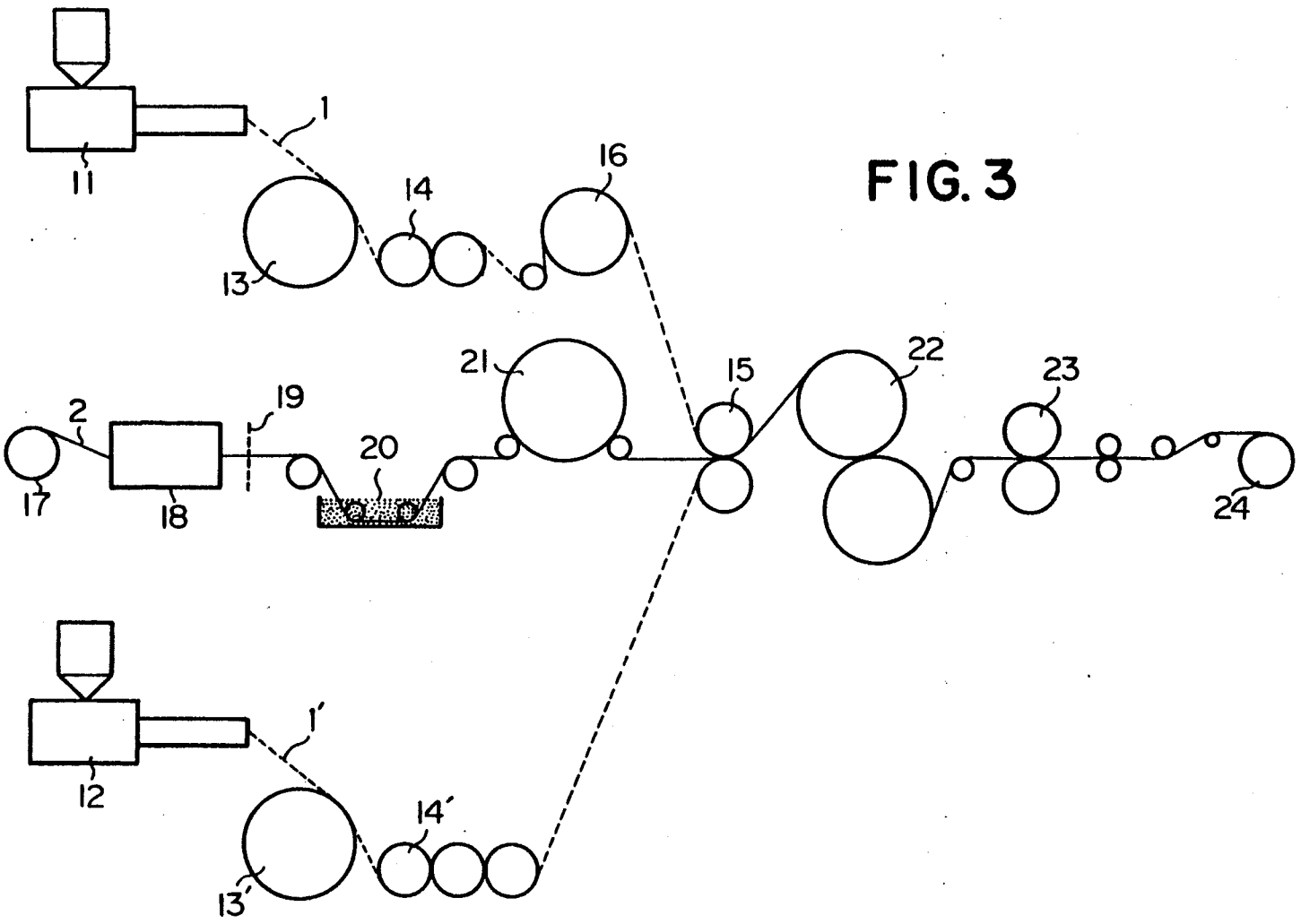
FIG. 3 is a schematic view showing an embodiment of apparatus by which the process of the present invention is carried out.

FIG. 3 is a schematic view showing an embodiment of apparatus for producing the laminate comprising the layer of continuous filaments and the film, wherein a film is further laminated on the layer of continuous filaments. Films 1 and 1' extruded from a pair of film-forming apparatus 11 and 12, respectively, are cooled to solidification by means of cooling drums 13 and 13' and cooling rollers 14 and 14', and subsequently piled up by means of a piling device 15. In this case, the film 1 is preheated by means of a heating drum 16. It is sometimes preferred to preheat the film according to the kind of the thermoplastic resin or the film-forming process. When a pair of films are used, it is preferable that one film alone is melted and the other one is bonded by fusion while keeping its original form. It is therefore preferable to enhance the crystallization and the orientation of one film more than those of the other one and to control the preheating carried out prior to the heat pressing. In FIG. 3, an example is shown in which one film is preheated.

On the other hand, the continuous filaments 2 for reinforcement unwound from a package 17 are opened by means of an opener 18 and paralleled by means of a screen 19. Thereafter, a resinous adhesive or the same resin as that of the films 1 and 1' is applied to the filaments at a dipping tank 20. The filaments thus treated are preheated by means of a preheater 21 and disposed between the films 1 and 1' at the piling device 15. The treatment of the continuous filaments 2 with the adhesive or the resin, or the preheating thereof by the preheater 21 has an effect to enhance their adhesive property to the films 1 and 1'.

The films 1 and 1' and the continuous filaments 2 for reinforcement piled by means of the piling device 15 are preheated by preheating drums 22. The preheating is preferably performed substantially on both sides of the piled sheet. When the thermoplastic resin and the thermosetting resin are combined as described above, it is desirable to apply different temperatures to both sides of the sheet, respectively. Then, this sheet is pressed by means of a heat pressing device 23 such as calender rollers at an elevated temperature and under a high pressure to provide a laminate. The conditions of the heat pressing device 23 are suitably selected according to the thermoplastic resin employed. The laminate thus obtained is wound up by a winder 24.

Figure 4:
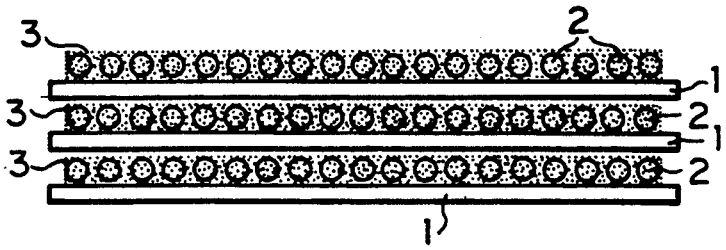
FIG. 4 is a longitudinal sectional view showing an embodiment in which the laminates used in the present invention are further piled in a plurality of layers.

The laminate alone or the laminates further piled in a plurality of layers and bonded by heat pressing, adhered, bonded by fusion or melted to each other are molded to give a composite article having a curved surface by press molding or the like. When the laminates each composed of the continuous filaments for reinforcement and the film are further piled and molded, an adhesive, an adhesive film or the like is preferably disposed therebetween according to the kinds of the fiber and the film. A decorative film may also be used as an outer layer. The decorative film is preferable to have a high surface hardness. FIG. 4 shows an embodiment in which there are further piled in a plurality of layers the laminates each composed of the extensible resinous film 1 and the layer of the continuous filaments 2 unidirectionally paralleled and adhered thereto by means of an adhesive 3.

Figure 5:
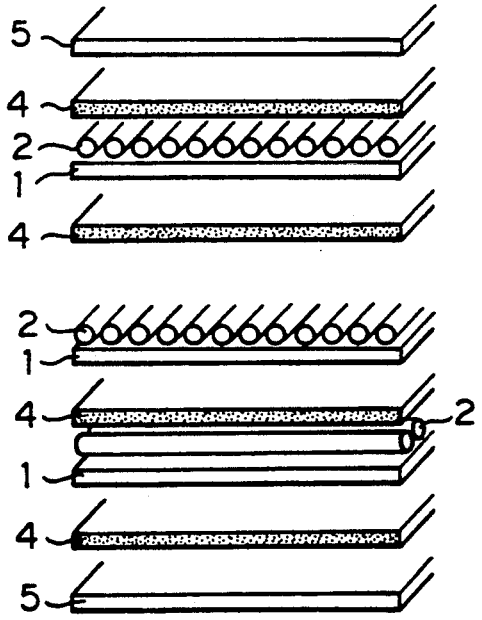
FIGS. 5 and 6 are perspective views showing other embodiments in which the laminates are further piled in a plurality of layers.
Figure 6:
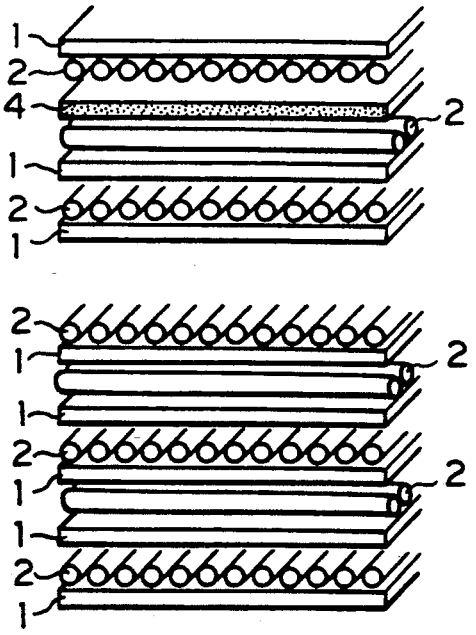

It is further preferable that the laminates are arranged in a plurality of layers in such a manner that the directions in which the continuous filaments are paralleled in the respective laminates make an angle with each other, because a molded article having an uniform strength in any direction can be obtained. FIGS. 5 and 6 show embodiments in which the laminates each comprising the extensible resinous film 1 and the layer of the continuous filaments 2 unidirectionally paralleled are further piled in a plurality of layers in such a manner that the directions in which the continuous filaments are paralleled in the respective laminates make an angle with each other. Designated by 4 is an adhesive film and designated by is a decorative film.

Figure 7:
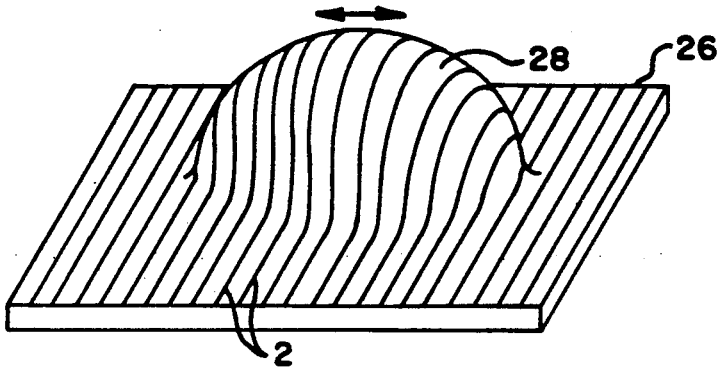
FIG. 7 is a fragmentary perspective view of an article made in accordance with this invention.

A composite article 26 having the curved surface 28, a shown in FIG. 7, can be molded by placing the laminate or the laminates in a mold having a curved surface and heat pressing it.

The laminate used in the present invention comprises the layer of the continuous filaments unidirectionally paralleled and the extensible resinous film. Accordingly, when the laminate is formed into the curved surface 28 by press molding or the like, the spaces among the continuous filaments are increased and the film is extended depending on the curved surface, as shown in FIG. 7. Therefore, it does not occur that the continuous filaments for reinforcement are broken to lower the strength of the molded composite article or the composite article itself is broken. Further, the continuous filaments unidirectionally paralleled are fixedly laminated on the extensible resinous film. Therefore, it does not occur that the tensile strength and the initial modulus of the molded composite article vary or are not sufficiently improved. Furthermore, as the continuous filaments are used for reinforcement, more sufficient reinforcing effect can be obtained than that obtained when the staple fibers are used, and it does not take place that the staple fibers come to appear at the surface of the product, resulting in the roughness of the surface and the deterioration in appearance of the product.

The present invention will now be described in detail with reference to the following examples that by no means limit the scope of the invention.

EXAMPLE 1

Polyethylene terephthalate having an intrinsic viscosity of 0.79 prepared by condensation polymerization from dimethyl terephthalate and ethylene glycol was extruded by an extruder at a temperature of 290° C. to form a 0.05 mm-thick film (undrawn film).

On the other hand, carbon filaments (Torayca ® T-300, supplied by Toray Industries, Inc.) manufactured from polyacrylonitrile were coated with a solution of polyethylene terephthalate described above in o-chlorophenol.

After incomplete evaporation of the solvent, the filaments were unidirectionally paralleled and arranged on the polyethylene terephthalate film. The resultant was dried, while putting it between plates. Thus, the laminate was obtained in which the carbon filaments unidirectionally paralleled were adhered to the polyester film. The laminates thus obtained were further piled in eight layers in such a manner that the directions in which the carbon filaments were paralleled in the respective laminates made an angle of 45° with each other and placed in a cup-shaped mold with a radius of 200 mm previously heated at a temperature of about 150° C. The laminates were pressed in the mold at a temperature of 300° C., under a pressing load of 5 tons. After the temperature reached to 300° C., the mold was maintained at that temperature for 3 minutes, and then dipped in iced water for cooling. Thus, a molded article having a thickness of 1 mm was obtained. This molded article had a density of about 1.5 g/cm$^3$, a fiber volume percentage ($V_f$) of about 30%, a tensile strength in the direction of the fiber axis of 58 Kg/mm$^2$ and a tensile initial modulus of 3,500 Kg/mm$^2$. The surface of the molded article was smooth and showed a good appearance.

EXAMPLE 2

Glass filaments with a diameter of 10 μm were coated with an adhesive, Alonalpha ® supplied by Toagosei Chemical Industry Co., Ltd. The filaments were unidirectionally paralleled and arranged on a 20 μm-thick polypropylene film, when incompletely dried, and adhered thereto to form a laminate as a precursor for a composite material.

The resultant laminate was pressed in the cup-shaped mold used in Example 1. As a result, it was confirmed that the filaments were approximately symmetrically spread.

The laminates thus obtained were further piled in 5 layers and molded in the cup-shaped mold used in Example 1. The mold was previously heated to a presumed temperature of 70° C. After the laminates were placed in the mold, the temperature of the mold was raised to 180° C. After cooling, a cup-shaped article was obtained.

EXAMPLE 3

A 40% solution of polymetaphenylene isophthalamide having an intrinsic viscosity of 1.3 was prepared by dissolving this polymer together with calcium chloride in N-methyl-2-pyrrolidone. This solution was extruded in an aqueous solution of N-methyl-2-pyrrolidone to form a film, drawn and washed with water to form a 10 μm-thick film.

On the other hand, aromatic polyamide filaments, Technora ® supplied by Teijin Limited, having a tensile breaking elongation of about 2% and a diameter of 6 μm were unidirectionally paralleled and coated with a solution of polymetaphenylene isophthalamide in N-methyl-2-pyrrolidone. The filaments thus treated were pressedly attached to a film of polymetaphenylene isophthalamide described above when incompletely dried to form a laminate.

The resultant laminates were further piled in five layers in such a manner that the directions in which the filaments were arranged in the respective laminates made an angle of 90° with each other and molded in the cup-shaped mold used in Example 1. The mold was previously heated to a temperature of 360° C. The pressing temperature was 360° C. and the pressing load was 10 tons.

The molded article thus obtained had a density of 1.35 g/cm$^3$, a fiber volume percentage ($V_f$) of about 20%, a tensile strength in the direction of the fiber axis of 26 Kg/mm$^2$ and a tensile initial modulus of 760 Kg/mm$^2$. The surface of the molded article was smooth and showed a good appearance.

EXAMPLE 4

Carbon filaments were coated with a methylene chloride solution of a polycarbonate prepared from bisphenol A and dried to form sheath-core filaments. The sheath-core filaments thus obtained were heated, unidirectionally arranged on a polycarbonate film, and pressedly attached thereto to form a laminate.

After cooling, the above solution of the polycarbonate in methylene chloride was applied to the filament side of the laminate and dried.

The resultant laminates were further piled in eight layers in such a manner that the directions in which the filaments were arranged in the respective laminates made an angle of 90° with each other and molded in the cup-shaped mold used in Example 1.

The molded article thus obtained had a tensile strength of 549 Kg/MM$^2$ and a tensile initial modulus of 1.120 Kg/mm$^2$. The surface of the molded article was smooth and showed a good appearance.

EXAMPLE 5

ε-caprolactam having a small amount (about 0.3%) of water added was maintained at a temperature of 250° C. under the atmosphere replaced with nitrogen to prepare a polymer.

This polymer was extruded by means of an extruder at a temperature of 270° C. to form a 20 μm-thick film, after fully washed with water and dried.

The commercial aromatic polyamide filaments, Technora ® filaments were dipped in a solution of polymetaphenylene isophthalamide in N-methyl-2-pyrrolidone, taken out therefrom, loosened and dried. The filaments thus treated were unidirectionally arranged on a commercial nylon 6 undrawn film and heat pressed at a temperature of 180° C., under a pressing load of 250 Kg/mm$^2$ to form a laminate.

This laminate was moldable in the cup-shaped mold used in Example 1. The molded article had the smooth surface and a good appearance.

EXAMPLE 6

A molded composite article comprising continuous filaments, films and adhesive layers was produced.

At first, a composite material comprising commercial carbon filaments (Torayca ® T-400, supplied by Toray Industries, Inc.) and polyethylene terephthalate was prepared.

That is to say, polyethylene terephathalate was formed into a 50 μm-thick film by the melt extruding process. The drawing was not particularly carried out.

The above-mentioned carbon filaments were opened, unidirectionally paralleled and wound on a metal reel. Then, the filaments were disposed on a polyethylene terephthalate film and pressed at a temperature of 180° C. to form a laminate. The laminate thus obtained comprised 68 g/m$^2$ of polyethylene terephthalate and 36 g/m$^2$ of carbon filaments.

The resultant laminates were piled in ten layers in such a manner that the directions in which the filaments were arranged in the respective laminates made an angle of 90° with each other, and 50 μm-thick polyethylene terephthalate films were piled on both outer sides thereof. Further, thermosetting type polyester hot melt adhesive films were inserted between the respective sheets. The whole was pressed in the cup-shaped mold used in Example 1 at a temperature of 150° C., under a pressing load of 100 Kg/cm$^2$. The laminates were piled in such a manner that the carbon filaments in each laminate were directed to the same direction.

The properties of the cup-shaped molded article thus obtained were as follows:

Density: 1.45 g/cm$^3$
Average fiber volume percentage: 20.5%
Average tensile strength: 37.6 Kg/mm$^2$
Average tensile initial modulus: 690 Kg/mm$^2$ The surface of the molded article was smooth and showed a good appearance.

EXAMPLE 7

A laminate was prepared by the apparatus shown in FIG. 3. Polyethylene terephthalate was formed into a film with a thickness of about 5 μm, by the film-forming apparatus 11 and 12, wherein the intrinsic viscosity of the polymer was 0.65 and the temperature of the extruder was 300° C.

As the continuous filaments, the commercial carbon filaments each having a diameter of about 10 μm were employed. The filaments had a tensile strength of 300 $Kg/mm^2$ and a tensile initial modulus of 25,000 $Kg/mm^2$. The filaments were opened by the use of a tow opener employed in the preparation of the tow opening type continuous filament nonwoven fabrics, unidirectionally paralleled, and preheated by the heating roller. The temperature of the opened tow was 150° C., when measured through a sensor of a surface thermometer.

The carbon filaments were sandwiched between the films supplied from the film-forming apparatus 11 and 12 described above, and heated to 150° C. by the roller type preheater. Subsequently, the resultant was treated by means of the heat pressing rollers at a temperature of 200° C., under a line pressure of 50 Kg/cm to produce a laminate.

The laminate thus obtained showed a fiber volume percentage ($V_f$) of 51%, a tensile strength of 151 $Kg/mm^2$ and a tensile initial modulus of 13,000 $Kg/mm^2$ after cooling.

The laminates were piled in eight layers in such a manner that the directions in which the filaments were arranged in the respective laminates made an angle of 90° with each other and heat pressed in the cup-shaped mold used in Example 1 at a temperature of 280° C., under a pressing lead of 100 $Kg/mm^2$, to produce a molded composite article having a curved surface.

The resultant molded article had a tensile strength of 70 $Kg/mm^2$ and a tensile initial modulus of 675 $Kg/mm^2$. The surface of the molded article was smooth and the appearance thereof was also good.

EXAMPLE 8

A laminate was prepared in a similar manner as in Example 7, with the exception that the extruder 11 was not used and the laminate was composed of the continuous filaments and a layer of film.

This laminate could be handled more easily than the laminate in Example 7, when molded into an article having a curved surface. The physical properties of the resultant molded article were approximately similar to those of the article obtained in Example 7, and the appearance thereof was also satisfactory.

EXAMPLE 9

A laminate was prepared in a similar manner as in Example 7.

Polybutylene terephthalate was formed into a film by the film-forming apparatus 11 and 12, wherein the intrinsic viscosity of the polymer was 0.72 and the temperature of the extruder was 290° C.

As the continuous filaments, the commercial carbon filaments having a tensile strength of 300 $Kg/mm^2$ and a tensile initial modulus of 25,000 Kg/mm2 were employed. The filaments were opened by the use of a tow opener employed in the preparation of the tow opening type continuous filament nonwoven fabrics, unidirectionally paralleled, and preheated by the heating roller. The temperature of the opened tow was 150° C., when measured through a sensor of a surface thermometer.

The carbon filaments were sandwiched between the obtained films and heated to 180° C. by the roller type preheater. Subsequently, the resultant was treated by means of the heat pressing rollers at a temperature of 200° C., under a line pressure of 50 Kg/cm to produce a laminate.

The laminate thus obtained showed a fiber volume percentage ($V_f$) of 50%, tensile strength of 145 $Kg/mm^2$ and a tensile initial modulus of 11,000 $Kg/mm^2$ after cooling.

The laminates were piled in eight layers in such a manner that the directions in which the filaments were arranged in the respective laminates made an angle of 90° with each other and heat pressed in the cup-shaped mold used in Example 1 at a temperature of 280° C., under a pressing lead of 100 $Kg/cm^2$ to produce a molded composite article having a curved surface.

The resultant molded article had a tensile strength of 728 $Kg/mm^2$ and a tensile initial modulus of 600 $Kg/mm^2$. The surface of the molded article was smooth and the appearance thereof was also good.

EXAMPLE 10

A laminate was prepared by modifying the apparatus shown in FIG. 3.

Each of the film-forming apparatus 11 and 12 was replaced by apparatus for forming a film by extruding a polymer solution into a coagulation bath through a die. A 42% solution of polymetaphenylene isophthalamide having an intrinsic viscosity of 1.28 was prepared by dissolving this polymer together with calcium chloride in N-methyl-2-pyrrolidone. This solution was extruded in a coagulation bath, namely an aqueous solution of N-methyl-2-pyrrolidone and calcium chloride, to form a film, washed with water to remove calcium chloride, and dried.

On the other hand, polymetaphenylene isophthalamide filaments (TEIJINCONEX ® supplied by Teijin Limited) were opened by the opener similar to that used in Example 7, and paralleled in one direction.

The films and the filaments were laminated, heated by the preheater (heating drum) of which temperature was 280° C., and subsequently heat pressed by the heat pressing calender. The temperature of the calender was 320° C. and the pressure thereof was 100 $Kg/cm^2$.

The laminate thus obtained was cut in plural sheets. They were further piled in eight layers and heat pressed in the cup-shaped mold used in Example 1 at temperature of 360° C., under a pressing load of 100 $Kg/cm^2$. The surface of the resultant molded article was smooth and the appearance thereof was also satisfactory.

EXAMPLE 11

A polyethylene terephthalate film was prepared, using one film-forming apparatus 11 of the apparatus 11 and 12 shown in FIG. 3. The intrinsic viscosity of polyethylene terephthalate was 0.64.

Carbon filaments were passed through a solution of polyethylene terephthalate in o-chlorophenol after the filaments were opened. The carbon filaments thus obtained were dried and the amount of the resin with which the filaments were impregnated were measured. As a result, the amount of the resin was 24% by weight, based on that of carbon filaments.

The carbon filaments coated with the resin were heated to 180° C., piled on the film, further heated to 200° C., and heat pressed by means of the calender rollers at a temperature of 240° C., under a line pressure of 100 Kg/cm to form a laminate.

The laminate thus obtained had a fiber volume percentage of 49%, a tensile strength of 138 Kg/mm$^2$ and a tensile initial modulus of 1,280 Kg/mm$^2$.

The resultant laminates were piled in eight layers in such a manner that the directions in which the filaments were arranged in the respective laminates made an angle of 45° with each other, placed in the cup-shaped mold used in Example 1 and heat pressed at a temperature of 290° C., under a pressing load of 100 Kg/cm$^2$ to form a molded composite article having a spherical surface.

The molded article thus obtained had a tensile strength of 74 Kg/mm$^2$ and a tensile initial modulus of 650 Kg/mm$^2$. The surface of the molded article was smooth and the appearance thereof was also good.

EXAMPLE 12

A composite material comprising commercial carbon filaments (Torayca ®T-300, supplied by Toray Industries, Inc.) and polyetheretherketone (hereinafter referred to as PEEK for brevity).

That is to say, commercial PEEK was formed into a film with a thickness of about 50 μm by the melt-extruding process. The drawing was not particularly carried out.

The above-mentioned carbon filaments were opened, unidirectionally paralleled and wound on a metal reel. Then, the filaments were disposed on a PEEK film and pressed at a temperature of 280° C. to form a laminate. The laminate thus obtained comprised 95 g/m$^2$ of PEEK and 5 g/m$^2$ of carbon filaments. The laminates each cut in a square which was 250 mm by 250 mm in dimensions were piled in 12 layers in such a manner that the directions in which the filaments were arranged in the respective laminates made an angle of 90° with each other, and heat pressed at a temperature of 280° C., under a pressing load of 100 Kg/cm$^2$. The physical properties of the resultant composite material were as follow:

Average tensile strength: 25 Kg/mm$^2$

Tensile initial modulus: 680 Kg/mm$^2$

This intermediate composite material was placed in a hot air dryer maintained at a temperature of 290° C. for 30 minutes, taken out from the dryer, pressed in a tray-shaped mold maintained at a temperature of 250° C. immediately thereafter, and then dipped in iced water together with the mold for cooling. The molded article taken out from the mold showed the following values, which are approximately similar to those of the intermediate composite material.

Tensile strength: 18.2 Kg/mm$^2$

Tensile initial modulus: 528 Kg/mm$^2$

The same process was repeated with the exception that the carbon filaments were not incorporated.

The physical properties of the molded article composed of PEEK alone were as follows:

Tensile strength: 6.2 Kg/mm$^2$

Tensile initial modulus: 203 Kg/mm$^2$

EXAMPLE 1

An optically anisotropic polyester prepared from

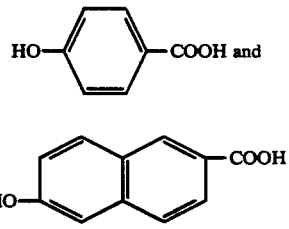

was formed into a 200 μm-thick film by the melt extruding process. On the other hand, the carbon filaments, Torayca ®T-300, were unidirectionally paralleled, wound on a metal reel, then disposed on the film of the above polyester, and pressed at a temperature of 280° C., under a pressing load of 50 Kg/cm$^2$ for adhesion to prepare a laminate. In this case, the polyester was extruded to form a film in the same direction as that in which the filaments were paralleled.

The laminates were piled in twelve layers in such a manner that the directions in which the filaments were arranged in the respective laminates made an angle of 90° with each other, heated by the dryer, and pressed at a temperature of 300° C. to produce a molded article with a curved surface.

The physical properties of the resultant molded article were as follows:

Tensile strength: 20.1 Kg/mm$^2$

Tensile initial modulus: 399 Kg/mm$^2$

The same process was repeated with the exception that the carbon filaments were not incorporated.

The physical properties of the molded article composed of the polyester alone were as follows:

Tensile strength 17.5 Kg/mm$^2$

Tensile inityial modulus: 225 Kg/mm$^2$

EXAMPLE 14

The optical anisotropic polyester employed in Example 13 was formed into a 60 μm-thick film by the melt extruding process. On the other hand, the carbon filaments, Torayca ® T-300, were unidirectionally paralleled, would on a metal reel, then disposed on the film of the above polyester, and pressed at a temperature of 280° C., under a pressing load of 50 Kg/cm$^2$ for adhesion to prepare a laminate. In this case, the polyester was extruded to form a film in the same direction as that in which the filaments were paralleled.

The laminates were piled in twelve layers in such a manner that the directions in which the filaments were arranged in the respective laminates made an angle of 90° with each other, heated by the dryer, and pressed at a temperature of 300° C. to produce a molded article with a curved surface.

The physical properties of the resultant molded article were as follows:

Tensile strength: 53.5 Kg/mm$^2$

Tensile initial modulus: 1304 Kg/mm$^2$

The same process was repeated with the exception that the carbon filaments were not incorporated.

The physical properties of the molded article composed of the polyester alone were as follows:

Tensile strength: 20.9 Kg/mm$^2$

Tensile initial modulus: 700 Kg/mm$^2$

As apparent from the examples described above, according to the present invention, the laminate comprising the filaments for reinforcement and the film can be molded into the article having a curved surface without breakage or a reduction of strength, and the molded composite article having a curved surface which is excellent in smoothness of the surface and in appearance and sufficient in strength can be provided.

The molded composite article of the present invention can be effectively utilized particularly for bodies for various vehicles such as automotive vehicles, various containers, chairs, benches and the like.

What is claimed is:

1. A process for producing a molded composite article having at least one substantially hemispherical surface, which comprises:

unidirectionally paralleling continuous filaments in such a manner that said filaments substantially define a layer and are spaced apart from each other;

bonding said paralleled spaced continuous filaments on an extensible thermoplastic film to provide a laminate;

stacking at least two of said laminates to form a sheet wherein said paralleled filaments in each laminate are laid at an angle to said filaments in an adjacent laminate and wherein the film of one of said at least two laminates is in facing relation to said continuous filaments of the other of said at least two laminates; and thereafter, molding said sheet so as to form an article having at least one substantially hemispherical portion which is reinforced with said paralleled filaments and wherein the spaces between said continuous filaments are increased and the film is extended.

2. A process for producing a molded composite article according to claim 1, wherein the extensible thermoplastic film of at least one laminate is supplied from a film forming apparatus.

3. A process for producing a molded composite article according to claim 1, wherein the filaments are laminated between first and second extensible thermoplastic films, and wherein said films are supplied from separate film forming apparatus.

* * * * *